United States Patent
Kanno

(10) Patent No.: US 9,999,071 B2
(45) Date of Patent: Jun. 12, 2018

(54) TERMINAL DEVICE AND METHOD FOR CONTROLLING WIRELESS COMMUNICATION STATE

(71) Applicant: Sony Corporation, Tokyo (JP)

(72) Inventor: Manabu Kanno, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 125 days.

(21) Appl. No.: 14/473,538

(22) Filed: Aug. 29, 2014

(65) Prior Publication Data

US 2016/0066344 A1   Mar. 3, 2016

(51) Int. Cl.
*H04W 74/00* (2009.01)
*H04W 48/02* (2009.01)
*H04W 64/00* (2009.01)
*H04W 84/12* (2009.01)

(52) U.S. Cl.
CPC ......... *H04W 74/002* (2013.01); *H04W 48/02* (2013.01); *H04W 64/00* (2013.01); *H04W 84/12* (2013.01)

(58) Field of Classification Search
CPC .... H04W 48/02; H04W 64/00; H04W 64/003
See application file for complete search history.

(56) References Cited

U.S. PATENT DOCUMENTS

| | | | |
|---|---|---|---|
| 8,565,107 B2 | 10/2013 | Pease et al. | |
| 2007/0002885 A1* | 1/2007 | Lee | H04H 60/15 370/432 |
| 2012/0076045 A1* | 3/2012 | Pease | H04W 48/16 370/254 |
| 2014/0004868 A1* | 1/2014 | Agardh | H04W 48/16 455/452.1 |
| 2014/0036848 A1 | 2/2014 | Pease et al. | |
| 2014/0179336 A1* | 6/2014 | Steer | H04W 4/021 455/456.1 |
| 2015/0005026 A1* | 1/2015 | Wild | H04W 52/367 455/522 |
| 2016/0119793 A1* | 4/2016 | Tudose | H04W 16/14 455/447 |

FOREIGN PATENT DOCUMENTS

JP   2009-141671 A   6/2009

OTHER PUBLICATIONS

Extended European Search Report dated Jan. 27, 2016 in Patent Application No. 14190489.6.

* cited by examiner

*Primary Examiner* — Sulaiman Nooristany
(74) *Attorney, Agent, or Firm* — Oblon, McClelland, Maier & Neustadt, L.L.P.

(57) ABSTRACT

A terminal device includes circuitry configured to communicate wirelessly with an access point via a channel that has at a first signal strength and a first data rate. The circuitry is also configured to determine wireless transmission channel restrictions and obtain a position of the terminal device in order to determine if the wireless transmission channel restrictions apply to the terminal device based on the position of the terminal device. The circuitry is also configured to switch to a communications state that complies with the transmission channel restrictions and if the wireless transmission channel restrictions apply based on the position of the terminal device.

20 Claims, 6 Drawing Sheets

TERMINAL DEVICE AND METHOD FOR CONTROLLING WIRELESS COMMUNICATION STATE

BACKGROUND

Technical Field

The present disclosure relates to wireless communication control on a terminal device and related control processing based on a position of the device and transmission channel frequency.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Terminal devices, such as Smart Phones or tablets, are configured to wirelessly communicate with an access point through one of thirteen channels in a 2.4 GHz of the wireless Local Area Network (LAN) that uses the IEEE 802.11 standard. In certain locations around the world, the use of one or more channels is restricted based on potential frequency interference.

SUMMARY

A device and method for controlling wireless communications of a terminal device are discussed herein.

According to one exemplary embodiment, the disclosure is directed to a terminal device including: circuitry configured to communicate wirelessly with an access point via one of a plurality of predetermined channels at a first signal strength and a first data rate, determine wireless transmission channel restrictions, obtain a position of the terminal device, determine if the wireless transmission channel restrictions should apply to the terminal device based on the position of the terminal device, and switch to a communications state that complies with the wireless transmission channel restrictions based on the position of the terminal device and if the wireless transmission channel restrictions apply based on the position of the terminal device.

According to another exemplary embodiment, the disclosure is directed to a method of controlling wireless communications of a terminal device, including: communicating wirelessly with an access point via one of a plurality of predetermined channels at a first signal strength and a first data rate; determining wireless transmission channel restrictions; obtaining a position of the terminal device; determining if the wireless transmission channel restrictions should apply to the terminal device based on the position of the terminal device; and switching to a communications state that complies with the wireless transmission channel restrictions based on the position of the terminal device and if the wireless transmission channel restrictions apply based on the position of the terminal device.

According to another exemplary embodiment, the disclosure is directed to a non-transitory computer readable medium having instructions stored therein that, when executed by one or more processors, cause the one or more processors to perform a method of controlling wireless communications of a terminal device, the method including: communicating wirelessly with an access point via one of a plurality of predetermined channels at a first signal strength and a first data rate; determining wireless transmission channel restrictions; obtaining a position of the terminal device; determining if the wireless transmission channel restrictions should apply to the terminal device based on the position of the terminal device; and switching to a communications state that complies with the wireless transmission channel restrictions based on the position of the terminal device and if the wireless transmission channel restrictions apply based on the position of the terminal device.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
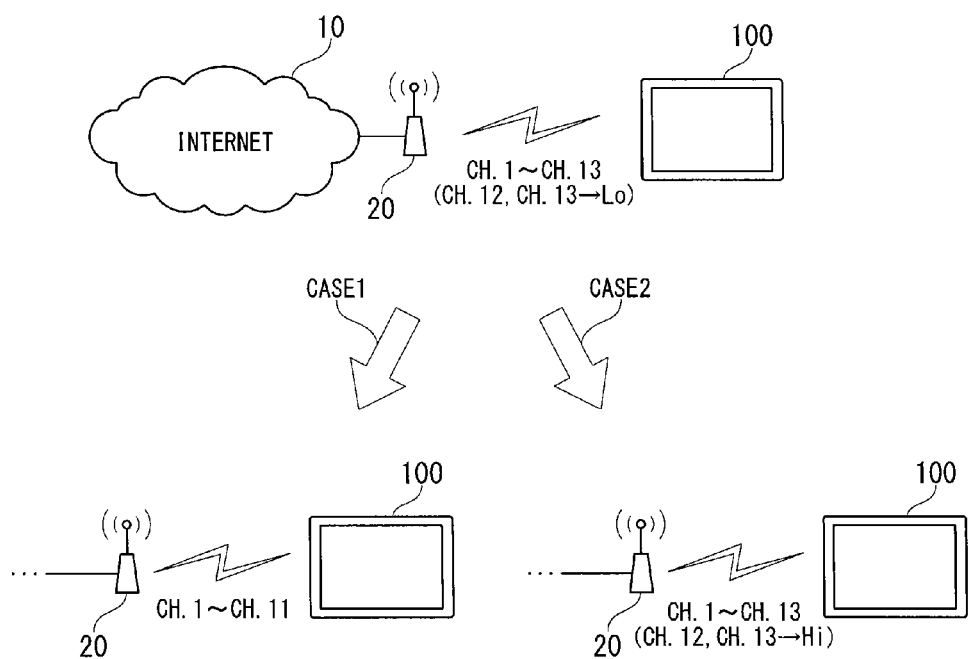
FIG. 1 illustrates an exemplary overview of wireless communication in a terminal device, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

This disclosure relates to a method of controlling wireless communication channels of a terminal device. For the remainder of this description, the phrase "terminal device" is meant to describe any sort of electronic device with a touchscreen display and wireless communication capability such as a Smart Phone, tablet, laptop, electronic book reader, portable music player, game terminal, and the like. This phrase is not meant to limit the scope of this disclosure, but is used to merely provide a more concise description.

FIG. 1 illustrates an exemplary overview of wireless communication in a terminal device, according to certain embodiments. The terminal device 100 can wirelessly communicate with access point 20 to gain access to a network such as the internet 10. In some implementations, the terminal device can have a near field wireless communication processor installed that can communicate wirelessly with external devices, e.g., via a wireless protocol such as BLUETOOTH, Near Field Communication (NFC), WI-FI, IEEE 802.11, etc. According to some aspects, the terminal device 100 wirelessly communicates with the access point 20 via the IEEE 802.11 standard, which can operate in thirteen channels in a 2.4 Gigahertz (GHz) band. In certain implementations, wireless communications in one or more channels can be restricted. For example, in certain locations, higher frequency channels having at least one frequency in a channel bandwidth greater than a predetermined frequency have restrictions applied based on laws and regulations. In certain embodiments where the IEEE 802.11 standard is used for wireless communications, Channels 12 and 13 can be included in the higher frequency channels. The restrictions for the higher frequency channels can include a maximum signal strength and/or a maximum data rate that can be transmitted in the higher frequency channels that is lower than the signal strength and data rate that can be transmitted in channels having lower frequencies than the higher frequency channels, such as Channels 1 through 11. Details regarding the restrictions on the signal strength and the data rate are discussed further herein.

In certain embodiments, the terminal device 100 establishes an initial transmission state with the access point 20 via one of a plurality of predetermined channels. If the terminal device 100 is wirelessly communicating with the access point on one of the higher frequency channels, which can include Channel 12 or Channel 13, a first signal strength and a first data rate are used that are lower than a maximum signal strength and maximum data rate specified by the laws and regulations.

In some implementations, the terminal device 100 is equipped with a positioning system that can determine a position of the terminal device 100. The position of the terminal device 100 is processed by control circuitry that determines whether the terminal device 100 is in a location that has restrictions imposed on the signal strength and data rate in Channels 12 and 13. In some embodiments, if the control circuitry determines that the position of the terminal device 100 restricts the use of Channels 12 and/or 13 of the IEEE 802.11 standard band, such as in the United States, a first case is implemented. In the first case, the wireless communications of the terminal device 100 with the access point 20 can be limited to the first eleven channels of the 2.4 GHz band, and Channels 12 and 13 are not used. If the control circuitry determines that the position of the terminal device allows the use of all thirteen channels, such as in Japan, a second case is implemented. In the second case, the wireless communications of the terminal device 100 with the access point 20 can use any of the thirteen channels of the 2.4 GHz band, and the signal strength and data rate restrictions are removed from Channels 12 and 13. In addition, in certain embodiments, if the terminal device is executing a software program or application that suppresses interference signals above the predetermined frequency, the second case can also be implemented.

Figure 2:
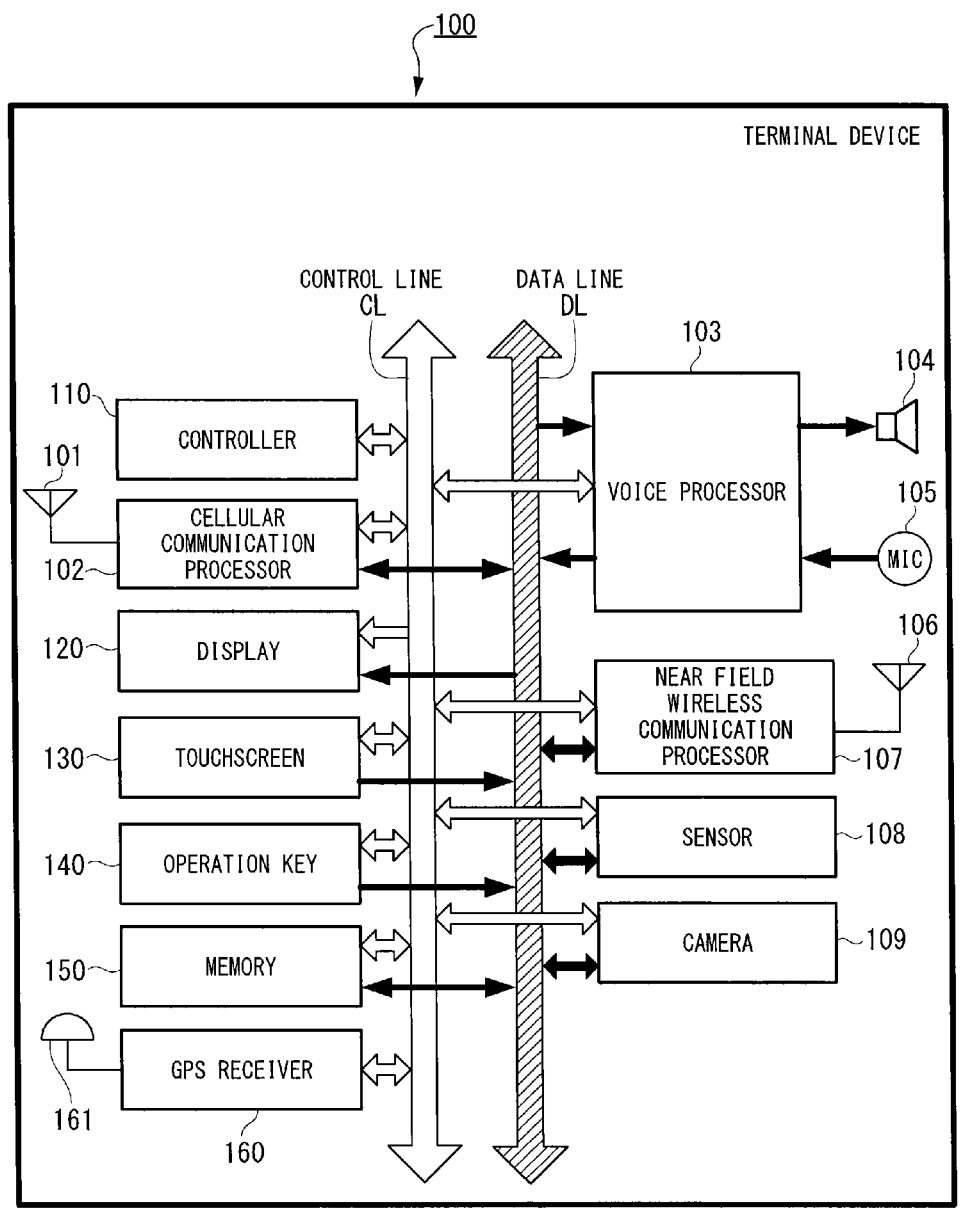
FIG. 2 illustrates a non-limiting example of a block diagram for a terminal device, according to certain embodiments.

FIG. 2 illustrates a non-limiting example of a block diagram for a terminal device, according to certain embodiments. The block diagram of the terminal device 100 includes sensors and processing circuitry for controlling wireless communications. The terminal device 100 is equipped with an antenna 101 for communicating with cell towers. The antenna 101 is connected to the wireless communication processing section 102. The wireless communication processing section 102 performs the processes of transmitting and receiving radio signals under the control of the controller 110. The controller 110 may include one or more Central Processing Units (CPUs), and may control each element in the terminal device 100 to perform features related to communication control, audio signal processing, control for the audio signal processing, control for display 120 processing, motion sensor processing, and other types of processing. The controller 110 may perform these functions by executing instructions stored in a memory 150. Alternatively or in addition to the local storage of the memory 150, the features may be executed using instructions stored on an external device accessed on a network, or on a non-transitory computer readable medium.

In addition to storing the instructions to be executed by the controller 110, the memory 150 stores data generated by user operation of the terminal device 100. In certain embodiments, the most recent position of the terminal device 100 can be stored in memory. In some implementations, wireless transmission channel restriction data can be stored in the memory 150 that can include one or more restriction locations as well signal strength and data rate restrictions based on the one or more restriction locations. The storage of data in the memory 150 and read-out of data from memory 150 are performed under the control of the controller 110.

The terminal device 100 includes a control line CL and data line DL as internal communication bus lines. Control data to/from the controller 110 may be transmitted through the control line CL. The data line DL may be used for transmission of voice data, display data, etc.

Voice data received by the wireless communication processor 101 is sent to the voice processor 103 through the data line DL. The voice processor 103 demodulates the voice data and obtains an analog voice signal. The analog voice signal is supplied to a speaker 104, and the speaker 104 outputs a sound corresponding to the analog voice signal. In addition, the voice processor 103 converts a voice signal from a microphone 105 to voice data that is supplied to the wireless communication processor 101 through the data line DL. The voice data that is sent to the wireless communication processor 101 is then converted to packets for radio transmission. If the terminal device 100 is not equipped with a voice call function, the voice processor 103, speaker 104, and microphone 105 may be omitted.

When the terminal device 100 is conducting data communication which may include the transmission or reception of electronic mail via a network, such as the internet, the cellular communications processor 102 transmits or receives the data under the control of the controller 110. In certain embodiments, the data received by the cellular communications processor 102 are stored in the memory 150, and the controller 110 is responsible for controlling the process of displaying the data that is stored in the memory 150. In addition, data stored in the memory 150 may be sent to the cellular communications processor 102 in order to be radio-transmitted. When the user desires to discard data such as unwanted electronic mail, the controller 110 erases the data stored in the memory 150.

The terminal device 100 includes a display 120. The display 120 displays still and moving image and text data via the controller 110. The display 120 may also display operational inputs such as numbers or icons, which may be used for control of the terminal device 100. The display 120 can also display a graphical user interface such that the user may control aspects of the terminal device 100 and/or other devices. In certain embodiments, the controller 110 may control the display 120 to display a home screen interface, the most recent interface, or another interface of the terminal device 100. Further, the display 120 may display characters and images received by the terminal device 100 and/or stored in the memory 150 or accessed from an external device on a network. For example, the terminal device 100 may access a network such as the Internet, and display text and/or images transmitted from a Web server. The display screen of the display 120 may be a Liquid Crystal Display (LCD) screen, an organic electroluminescence display panel, or another display screen technology.

The terminal device 100 is also equipped with a touchscreen 130, which is able to detect when an object such as a finger or a pen touches the display screen. Used herein, the phrase "touch operation" refers to an input operation performed by touching an operation surface of the touchscreen 130 with an instruction object, such as a finger, pen, or stylus-type instrument. In certain aspects of the present disclosure, the touchscreen 130 may be disposed adjacent to the display 120 (e.g., laminated), or may be formed integrally with the display 120. For simplicity, the present disclosure assumes the touchscreen 130 is formed integrally with the display 120 and therefore, examples discussed herein may describe touch operations being performed on the surface of the display 120 rather than the touchscreen 130. However, the skilled artisan will appreciate that this is not limiting.

For simplicity, the present disclosure assumes the touchscreen 130 is an electrostatic capacitance-type touch panel technology; however, it should be appreciated that aspects of the present disclosure may easily be applied to other touch panel types (e.g., resistance type touch panels) with alternate structures. In the case of an electrostatic-capacitance touch panel display, when conductors, such as a finger or stylus, approach or contact the touchscreen 130, the electrodes of the touchscreen 130 may detect and measure electrostatic capacitance changes, and features of the touch operation may be determined based on the detections/measurements.

In certain aspects of the present disclosure, the touchscreen 130 may include transparent electrode touch sensors arranged in the X-Y direction on the surface of transparent sensor glass. In this aspect, the X-axis is a horizontal axis, and the Y-axis is a vertical axis, which are orthogonally crossed. In certain embodiments, the data regarding the position on the X-Y axis that the touch operation occurred is transmitted to the controller 110, which then activates an application based on the touch position. In addition, if more than one touch operation occurs simultaneously in different positions on the display 120, the controller 110 may detect that one or more areas of the display 120 have been touched or that a wide area of the display 120, which may include the entire display 120, has been touched.

Next, an operation key 140 may include one or more buttons or similar external control elements, which may generate an operation signal based on a detected input from a user. In addition to outputs from the touchscreen 130, these operation signals may be supplied to the controller 110 for performing related processing and control. In certain aspects of the present disclosure, the processing and/or functions associated with external buttons and the like may be performed by the controller 110 in response to an input operation on the touch panel display screen rather than the external button, key, etc. In this way, external buttons on the terminal device 100 may be eliminated in lieu of performing inputs via touch operations, thereby improving water-tightness.

Next, a near field wireless communication processor 107 is configured to communicate wirelessly with external devices, e.g., via a wireless protocol such as BLUETOOTH, Near Field Communication (NFC), WI-FI, 802.11, etc. The near field wireless communication processor 107 enables the terminal device 100 to wirelessly communicate via an antenna 106 with other devices such as other terminal devices or access points. In certain embodiments where the near field wireless communication processor 107 is configured to use the 802.11 standard, 2.4 GHz frequency may be used.

The near field wireless communication processor 107 can be configured to use one or more signal modulation techniques and one or more IEEE 802.11 standards. In one implementation, the near field wireless communication processor 107 is configured to operate with the IEEE 802.11b standard, the IEEE 802.11g standard, or the IEEE 802.11n standard when using the 2.4 GHz transmission band. For example, if the near field wireless communication processor 107 is configured to use the IEEE 802.11b standard, then Direct Sequence Spread Spectrum (DSSS) modulation and a maximum data rate of 11 Megabits per second (Mbps) are used. If the near field wireless communication processor 107 is configured to use the IEEE 802.11g standard, then DSSS and orthogonal frequency-division multiplexing (OFDM) modulation techniques are used, and a maximum data rate of 54 Mbps can be applied to the transmission signal. In some implementations, the DSSS modulation is applied to a header part of the transmission, and the OFDM modulation is applied to a payload part of the transmission. If the near field wireless communication processor 107 is configured to use the IEEE 802.11n standard, then the OFDM modulation technique is used, and a maximum data rate of 600 Mbps can be applied to the transmission signal. The examples of the IEEE 802.11b, IEEE 802.11g, and IEEE 802.11n standards provided herein are exemplary, and other standards can be used in the near field wireless communication processor 107. Details regarding the near field wireless communication processor 107 are discussed further herein.

In some implementations, a GPS receiver 160 can be installed in the terminal device 100 that has a connected GPS antenna 161. The GPS receiver 160 receives GPS satellite signals and detects a position of the terminal device 100 based on the satellite signals. The position of the terminal device 100 can then be transmitted from the GPS receiver 160 to the controller 110. In certain embodiments, the controller 110 can use the position of the terminal device 100 to determine whether the higher frequency channels, such as Channels 12 and 13, are restricted.

The terminal device 100 can also include a camera 109 that can be a CMOS camera, CCD camera, or the like. In certain embodiments, images obtained by the camera 109 can be stored in the memory 150, which can later be shown to a user via the display 120. The terminal device 100 is also equipped with a sensor 108 that can be a motion sensor according to certain embodiments. The sensor 108 can output a detection signal to the controller 110 according to the movement of the terminal device 100. In some aspects, the sensor 108 can be an accelerometer, gyro sensor, or geomagnetic sensor.

Figure 3:
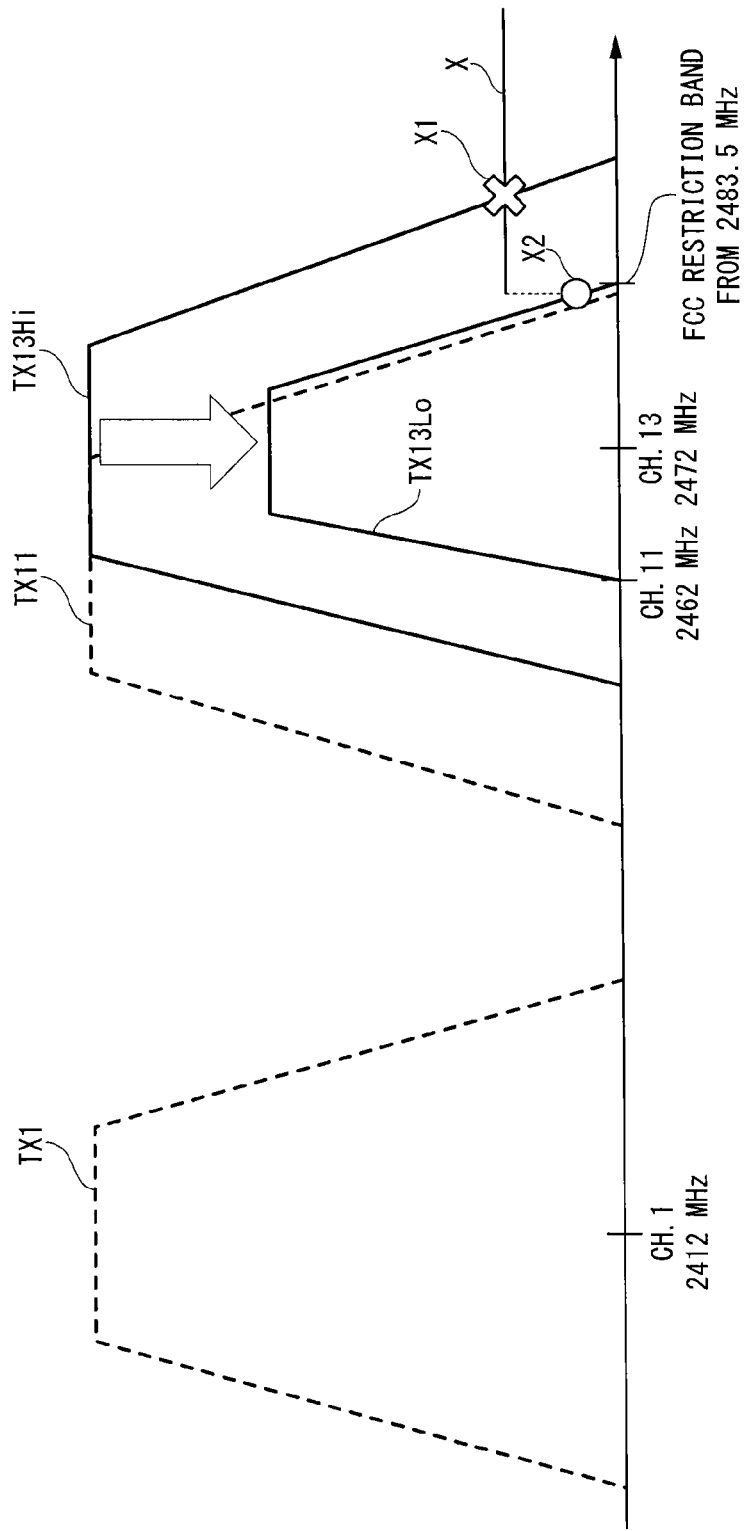
FIG. 3 illustrates an exemplary transmission channel for a near field wireless communication processor, according to certain embodiments.

Next, FIG. 3 illustrates an exemplary transmission channel for the near field wireless communication processor 107 for a 2.4 GHz transmission band, according to certain embodiments. In some implementations, transmission bands other than 2.4 GHz can be used that have been accepted by a governing communications organization, such as the Federal Communications Commission (FCC), but can include 3.6 GHz, 4.9 GHz, 5 GHz, or 5.9 GHz. The horizontal access represents the frequency spectrum of the transmission band, and the vertical access represents the signal strength of the transmission signal, which can also be referred to as transmission power. In the example of the 2.4 GHz transmission band, thirteen channels from Channel 1 to Channel 13 can be arranged at 5 Megahertz (MHz) intervals with equal bandwidths. More specifically, Channel 1 can have a center frequency of 2412 MHz, Channel 2 can have a center frequency of 2417 MHz, Channel 3 can have a center frequency of 2422 MHz, etc. For purposes of clarity, in FIG. 3, only the transmission signals TX1 for Channel 1, TX11 for Channel 11, and TX13Hi and TX13Lo for Channel 13 are shown. TX13Hi represents a maximum signal strength for Channel 13 when the terminal device 100 is in a location that does not restrict the use of Channel 13. TX13Lo represents a maximum signal strength for Channel 13 when the terminal device 100 is in a location that limits the signal strength of the transmission signal for Channel 13. The signal strength for Channel 13 can be any value less than or equal to the signal strength TX13Hi for the location that does not restrict the use of Channel 13. In addition, for the location that restricts the use of Channel 13, the signal strength can be any value less than or equal to the signal strength TX13Lo.

In the example of the 2.4 GHz transmission band, the controller 110 determines which channel is used by the near field wireless communication processor 107. In some implementations, the channel is determined based on the direction and/or distance of the access point 20 from the terminal device 100. In addition, the controller 110 can determine the data rate and the signal strength that is output by the near field wireless communication processor 107. In one implementation where the controller 110 determines that the position of the terminal device 100 does not restrict the higher frequency channels, such as Channel 13, the controller 110 can send a control signal to the near field wireless communication processor 107 to use Channel 13 and output a wireless signal with a signal strength that is equal to TX13Hi. In addition, in one implementation, the controller 110 may determine that the position of the terminal device 100 restricts Channel 13 to the TX13Lo signal strength. In this implementation, the controller 110 can send a control signal to the near field wireless communication processor 107 to use Channel 13 and output a wireless signal with a signal strength that is equal to TX13Lo.

In some aspects, Channel 12 and Channel 13 can be restricted by the governing communications organization, such as the FCC, because the frequency band that is greater than the predetermined frequency of 2483.5 MHz, as shown in FIG. 3, is assigned to communications systems other than wireless LANs. Therefore, in some implementations, the FCC may limit signal strength to X at frequencies greater than 2483.5 MHz. For the example of the transmission signal TX13Hi, the signal strength for the upper frequencies of the channel may be greater than the signal strength limit X. More specifically, TX13Hi exceeds the signal strength limit X at point X1. For the example of the transmission signal TX13Lo, the signal strength for the upper frequencies of the channel that are greater than 2483.5 MHz is less than the signal strength limit X. More specifically, TX13Lo crosses the greater than 2483.5 MHz frequency at point X2, and the signal strength for TX13Lo at frequencies greater than X2 is less than X, which satisfies the FCC restriction.

In certain implementations where there are no restrictions on the transmission signals output by the near field wireless communication processor 107, any of the IEEE 802.11 standards for which the near field wireless communication processor 107 is configured may be used. In some implementations, the near field wireless communication processor 107 is configured to operate with the IEEE 802.11b standard, the IEEE 802.11g standard, and the IEEE 802.11n standards when using the 2.4 GHz transmission band. In certain aspects where Channels 12 and 13 are restricted to the signal strength of TX13Lo and the lower data rate, the near field wireless communication processor 107 can use the IEEE 802.11b standard with the 11 Mbps data rate, which is a lower data rate than the data rates of the IEEE 802.11g and IEEE 802.11n standards.

In addition, the near field wireless communication processor 107 can assign an initial transmission state to Channels 12 and 13 before a determination is made regarding the position of the terminal device 100. For example, the initial transmission state for Channels 12 and 13 can be the signal strength of TX13Lo with a lower data rate. The near field wireless communication processor 107 can also apply the IEEE 802.11b standard to the initial transmission state for Channels 12 and 13 with the 11 Mbps data rate, which is lower than the data rates of the IEEE 802.11g and IEEE 802.11n standards.

Figure 4:
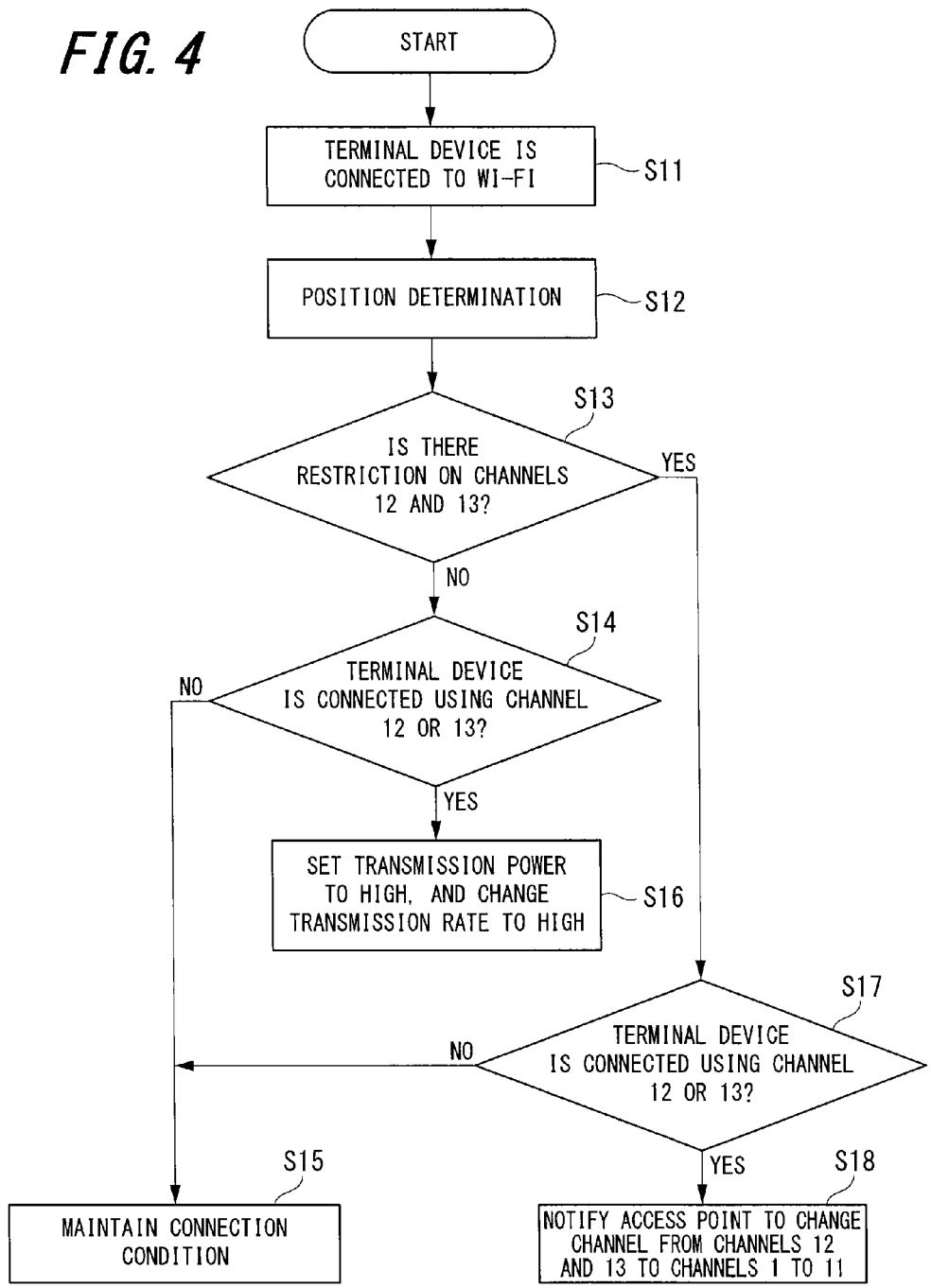
FIG. 4 illustrates a non-limiting exemplary flowchart for a process that controls a wireless communication state, according to certain embodiments.

Next, FIG. 4 illustrates a non-limiting exemplary flowchart for a process for a process that controls a wireless communication state, according to certain embodiments. At step S11, the controller determines that the near field wireless communication processor 107 has established wireless communications with the access point 20. In some implementations, the near field wireless communication processor 107 can assign the initial transmission state to the higher frequency channels, such as Channels 12 and 13, before a determination is made regarding the position of the terminal device 100. In addition, the initial transmission state can include using the IEEE 802.11b standard modulation technique for wireless communications. For example, the initial transmission state for Channels 12 and 13 can be the signal strength of TX13Lo with a lower data rate. Even at the lower signal strength and data rate, the access point 20 can receive and demodulate the signal approximately without error. At step S12, the controller 110 determines the position of the terminal device 100. Details regarding the position determination are discussed further with respect to FIG. 5.

At step S13, the controller 110 determines if the position of the terminal device is in a location that has restrictions on Channels 12 and 13 of the 2.4 GHz frequency band. The controller 110 compares the position of the terminal device 100 to the wireless transmission channel restrictions stored in the memory 150 that includes the locations where the Channels 12 and 13 restrictions are applied. For example, if the terminal device 100 is in a location that has restrictions on Channels 12 and 13, resulting in a "yes" at step S13, then the process continues to step S17. Otherwise, if the terminal device 100 is in a location that does not have restrictions on Channels 12 and 13, resulting in a "no" at step S13, then the process continues to step S14.

At step S14, if the terminal device is in a location that does not have restrictions on Channels 12 and 13, the controller 110 determines whether the near field wireless communication processor 107 is wirelessly communicating with the access point 20 via Channel 12 or Channel 13. If the near field wireless communication processor 107 is wirelessly communicating with the access point 20 via Channel 12 or Channel 13, resulting in a "yes" at step S14, then the process continues to step S16. Otherwise, if the near field wireless communication processor 107 is wirelessly communicating with the access point 20 via a channel other than Channel 12 or Channel 13, resulting in a "no" at step S14, then the process continues to step S15.

At step S15, the controller 110 maintains a wireless connection condition of the near field wireless communication processor 107 with the access point 20. In certain embodiments, the controller 110 maintains the wireless connection condition if the near field wireless communication processor 107 is wirelessly communicating with the access point 20 via a channel other than Channel 12 or Channel 13.

At step S16, the controller 110 increases the signal strength based on the determination that the terminal device 100 is in a location that does not restrict Channels 12 and 13, and the near field wireless communication processor 107 is using either Channel 12 or Channel 13 to conduct wireless communications. In certain embodiments, the control circuitry can send a signal to the near field wireless communication processor 107 to increase the signal strength to a level less than or equal to TX13Hi. In addition, the controller 110 can determine that the modulation techniques and data rates associated with standards other than IEEE 802.11b can be used for wireless communications, such as IEEE 802.11g and IEEE 802.11n.

At step S17, if it determined at step S13 that the terminal device 100 is in a location that has restrictions on Channels 12 and 13, the controller 110 determines whether the near field wireless communication processor 107 is wirelessly communicating with the access point 20 via Channel 12 or Channel 13. If the near field wireless communication processor 107 is wirelessly communicating with the access point 20 via a channel other than Channel 12 or Channel 13, resulting in a "no" at step S17, then the process continues to step S15. Otherwise, if the near field wireless communication processor 107 is wirelessly communicating with the access point 20 via Channel 12 or Channel 13, resulting in a "yes" at step S17, then the process continues to step S18.

At step S18, it has been determined that the terminal device 100 is in a location that restricts Channels 12 and 13, and the near field wireless communication processor 107 is using either Channel 12 or Channel 13 to conduct wireless communications with the access point 20. The controller 110 sends a signal via the control circuitry to the near field wireless communication processor 107 to change the wireless communications channel to any one of Channel 1 through Channel 11. In addition, the controller 110 can determine that the modulation techniques and data rates associated with standards other than IEEE 802.11b can be used for wireless communications, such as IEEE 802.11g and IEEE 802.11n. In certain embodiments, the near field wireless communication processor 107 sends a request to the access point 20 to change the wireless communication channel, and the access point 20 can switch channels.

Figure 5:
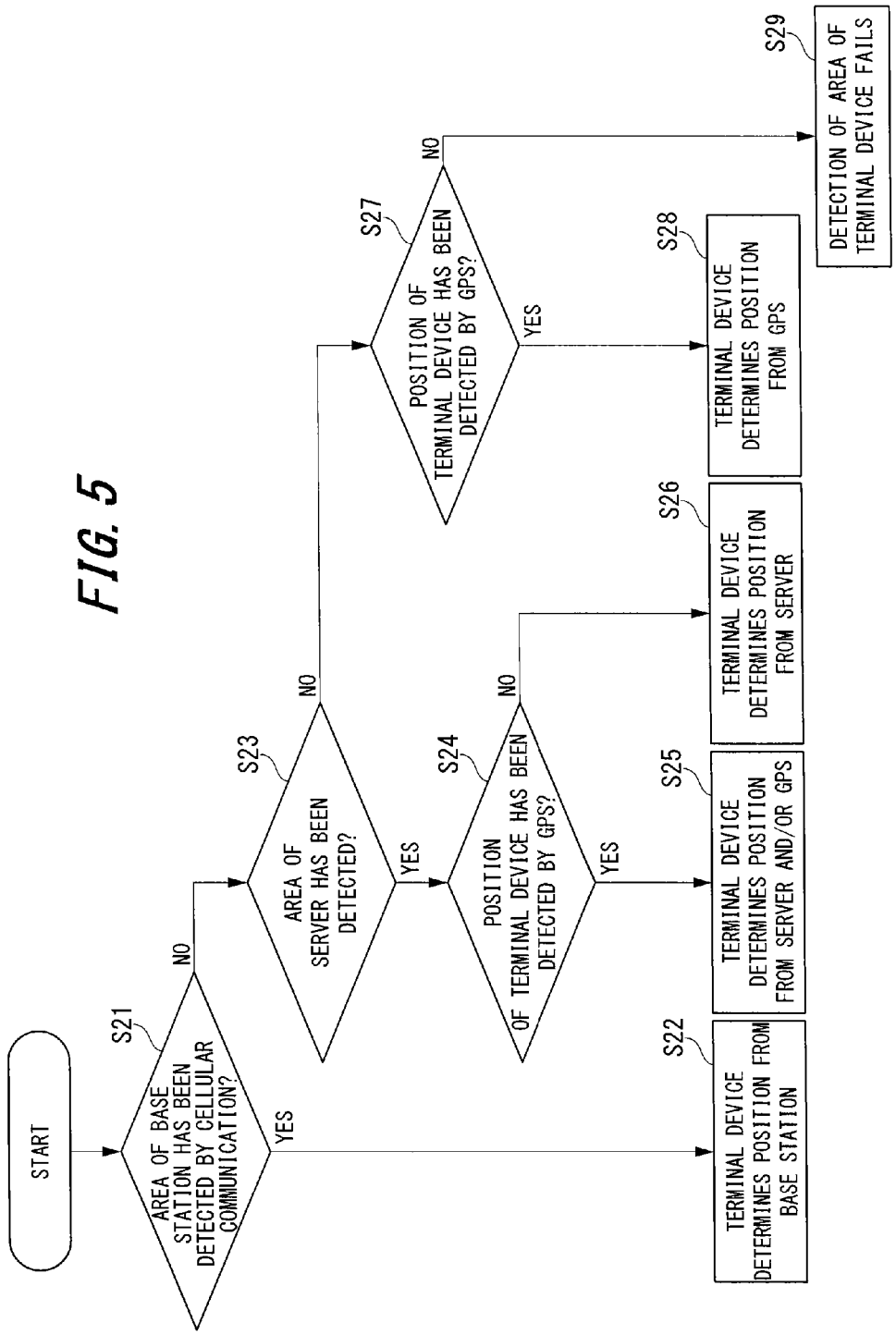
FIG. 5 illustrates a non-limiting exemplary flowchart for determining a position of a terminal device, according to certain embodiments.

Next, FIG. 5 illustrates a non-limiting exemplary flowchart for determining a position of a terminal device at step S12, according to certain embodiments. At step S21, the controller 110 determines if the cellular communications processor 102 is in communication with a base station for cellular communications, such as a cell tower, base transceiver station, or the like. In certain embodiments, the controller 110 can detect a location, such as a country, city, or the like, of the base station based on a code associated with the base station. If the location of the base station is not detected, resulting in a "no" at step S21, then step S23 is executed. In addition, if the terminal device 100 is not equipped with the cellular communications processor 102, then step S21 also results in a "no," and step S23 is executed. If the location of the base station is detected, resulting in a "yes" at step S21, then step S22 is executed. At step S22, the position of the terminal device 100 is determined based on the location of the base station, according to certain embodiments.

Next, step S23 is executed if the location of the base station is not detected or the terminal device 100 is not equipped with the cellular communications processor 102. The controller 110 can determine the position of the terminal device 100 based on an address or code of a server to which the access point 20 is connected when communicating with the near field wireless communication processor 107. In some embodiments, the address or code of the server is configured with a specific format that allows the controller 110 to extract the location of the server from the address or code of the server. However, in certain embodiments where the address or code of the server deviates from the specific format, the controller 110 may be unable to determine the location of the server. If the location of the server is detected, resulting in a "yes," at step S23, then step S24 is executed. Otherwise, if the location of the server is not detected, resulting in a "no" at step S23, then step S27 is executed.

At step S24, if the location of the server is detected, the controller 110 determines if the GPS receiver 160 has determined the position of the terminal device 100 within a predetermined tolerance. If the GPS receiver 160 has detected the position of the terminal device 100 within the predetermined tolerance, resulting in a "yes," then step S25 is executed. Otherwise, if the GPS receiver 160 has not detected the position of the terminal device 100 within the predetermined tolerance, resulting in a "no" at step S24, then step S26 is executed.

Next, step S25 is executed if the controller is able to determine the position of the terminal device 100 based on the location of the server and the position of the terminal device 100 detected by the GPS receiver 160. In certain embodiments, the controller 110 compares the location of the server to the position of the terminal device 100 detected by the GPS receiver 160. If the location of the server and the position of the terminal device 100 detected by the GPS receiver 160 do not correspond within a predetermined tolerance, then the controller determines that the position of the terminal device 100 corresponds to the position of the terminal device 100 detected by the GPS receiver 160. If the location of the server and the position of the terminal device 100 detected by the GPS receiver 160 correspond within the predetermined tolerance, then the controller 110 can determine the position of the terminal device 100 from either the location of the server or the position detected by the GPS receiver 160. In some embodiments, an average of the location of the server and the position detected by the GPS receiver is determined as the position of the terminal device 100.

Next, at step S26, the controller 110 determines the position of the terminal device 100 based on the location of the server if the GPS receiver has not detected the position of the terminal device 100 within the predetermined tolerance.

Next, step S27 is executed if the controller is unable to determine the location of the server at step S23. At step S27, the controller 110 determines if the GPS receiver 160 has determined the position of the terminal device 100 within the predetermined tolerance. If the GPS receiver 160 has determined the position of the terminal device 100 within the predetermined tolerance, resulting in a "yes" at step S27, then step S28 is executed. Otherwise, if the GPS receiver 160 has not determined the position of the terminal device 100 within the predetermined tolerance, resulting in a "no" at step S27, then step S29 is executed. Next, at step S28, the controller 110 determines the position of the terminal device 100 to be the position of the terminal device 100 detected by the GPS receiver 160.

At step S29, the controller 110 determines that the position determination of the terminal device 100 has failed. If the position determination of the terminal device 100 fails, then the process that controls the wireless communication state of the terminal device 100 as described in FIG. 4 is terminated after step S12. In certain embodiments, the near field wireless communication processor 107 remains the initial transmission state for Channels 12 and 13 until a determination can be made regarding the position of the terminal device 100.

Figure 6:
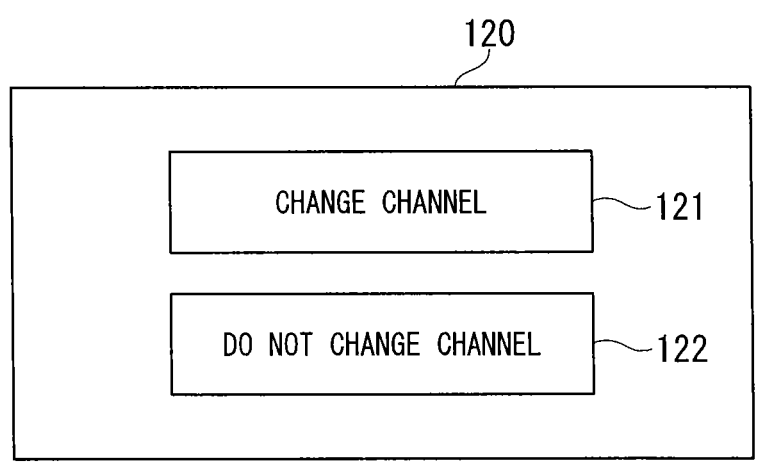
FIG. 6 illustrates an exemplary notification of a change in channel restrictions, according to certain embodiments.

Next, FIG. 6 illustrates an exemplary notification of a change in channel restrictions, according to certain embodiments. In some embodiments, it can be determined that the terminal device 100 is in a location that restricts Channels 12 and 13, and the near field wireless communication processor 107 is using either Channel 12 or Channel 13 to conduct wireless communications with the access point 20. As discussed with regard to step S18 of the process that controls the wireless communication state of the terminal device 100, the controller 110 can send a signal to the near field wireless communication processor 107 to change the wireless communication channel to any one of Channel 1 through Channel 11.

In addition, a user can control a change in the wireless communication channel via the notification on the display 120 as shown in FIG. 6. For example, if the terminal device 100 is in a location that restricts the use of Channels 12 and 13, the display 120 can provide the user with a first button 121 to change the wireless communication channel to any one of Channel 1 through Channel 11. The display 120 can also provide the user with a second button 122 that maintains the present wireless communication channel. If the user selects the first button 121, the controller 110 sends a signal to the near field wireless communication processor 107 to change the wireless communication channel to any one of Channel 1 through Channel 11. In addition, the controller 110 can determine that the modulation techniques and data rates associated with standards other than IEEE 802.11b can be used for wireless communications, such as IEEE 802.11g and IEEE 802.11n. In certain embodiments, the near field wireless communication processor 107 sends a request to the access point 20 to change the wireless communication channel, and the access point 20 can switch channels.

However, if the user selects the second button 122, the controller maintains the wireless communication channel through which the near field wireless communication processor 107 and the access point 20 are communicating when the second button 122 is selected. In certain embodiments, if Channel 12 or Channel 13 is being used as the wireless communication channel in a location with restrictions on Channels 12 and 13 and the user selects the second button 122, then the near field wireless communication processor 107 continues to communicate with the access point 20 via the initial transmission state with the limited signal strength and data rate as described previously.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

The above disclosure also encompasses the embodiments noted below.

(1) A terminal device, including: circuitry configured to communicate wirelessly with an access point via one of a plurality of predetermined channels at a first signal strength and a first data rate, determine wireless transmission channel restrictions, obtain a position of the terminal device, determine if the wireless transmission channel restrictions should apply to the terminal device based on the position of the terminal device, and switch to a communications state that complies with the wireless transmission channel restrictions based on the position of the terminal device and if the wireless transmission channel restrictions apply based on the position of the terminal device.

(2) The terminal device of (1), wherein the wireless transmission channel restrictions include one or more restriction locations that are stored in memory.

(3) The terminal device of (1) or (2), wherein the wireless transmission channel restrictions include a first maximum signal strength and a first maximum data rate at frequencies greater than a predetermined frequency.

(4) The terminal device of any one of (1) to (3), wherein higher frequency channels include one or more of the plurality of predetermined channels with at least one frequency in a channel bandwidth greater than the predetermined frequency.

(5) The terminal device of any one of (1) to (4), wherein the first signal strength and the first data rate of the higher frequency channels are less than the first maximum signal strength and the first maximum data rate.

(6) The terminal device of any one of (1) to (5), wherein the circuitry is configured to obtain the position of the terminal device from a positioning system receiver.

(7) The terminal device of any one of (1) to (6), wherein the circuitry is configured to obtain the position of the terminal device based on a location of a base station that is communicating with the terminal device.

(8) The terminal device of any one of (1) to (7), wherein the circuitry is configured to obtain the position of the terminal device based on a location of a server to which the terminal device is connected via the access point.

(9) The terminal device of any one of (1) to (8), wherein the circuitry is configured to determine if the position of the terminal device is within the one or more restriction locations.

(10) The terminal device of any one of (1) to (9), wherein the circuitry is configured to determine if the terminal device is communicating wirelessly via one of the higher frequency channels.

(11) The terminal device of any one of (1) to (10), wherein the terminal device is within one of the one or more restriction locations.

(12) The terminal device of any one of (1) to (11), wherein the circuitry is configured to notify the access point to switch to one of the plurality of predetermined channels other than the higher frequency channels if the terminal device is communicating wirelessly via one of the higher frequency channels.

(13) The terminal device of any one of (1) to (12), wherein the circuitry is configured to maintain a present channel that is other than the higher frequency channels.

(14) The terminal device of any one of (1) to (12), further comprising a user-selectable setting that is used by the circuitry to notify the access point to switch to one of the plurality of predetermined channels other than the higher frequency channels if the terminal device is communicating wirelessly via one of the higher frequency channels.

(15) The terminal device of any one of (1) to (14), wherein the user-selectable determines for the circuitry to maintain the present channel that is one of the higher frequency channels.

(16) The terminal device of any one of (1) to (15), wherein the terminal device is outside the one or more restriction locations.

(17) The terminal device of any one of (1) to (16), wherein the circuitry is configured to establish a second signal strength that is greater than the first signal strength and a second data rate that is greater than the first data rate if the terminal device is communicating wirelessly via one of the higher frequency channels.

(18) The terminal device of any one of (1) to (17) wherein the circuitry is configured to maintain wireless communication conditions if the terminal device is communicating wirelessly via one of the plurality of predetermined channels other than the higher frequency channels.

(19) A method of controlling wireless communications of a terminal device, including: communicating wirelessly with an access point via one of a plurality of predetermined channels at a first signal strength and a first data rate; determining wireless transmission channel restrictions; obtaining a position of the terminal device; determining if the wireless transmission channel restrictions should apply to the terminal device based on the position of the terminal device; and switching to a communications state that complies with the wireless transmission channel restrictions based on the position of the terminal device and if the wireless transmission channel restrictions apply based on the position of the terminal device.

(20) A non-transitory computer readable medium having instructions stored therein that, when executed by one or more processors, cause the one or more processors to perform a method of controlling wireless communications of a terminal device, the method including: communicating wirelessly with an access point via one of a plurality of predetermined channels at a first signal strength and a first data rate; determining wireless transmission channel restrictions; obtaining a position of the terminal device; determining if the wireless transmission channel restrictions should apply to the terminal device based on the position of the terminal device; and switching to a communications state that complies with the wireless transmission channel restrictions based on the position of the terminal device and if the wireless transmission channel restrictions apply based on the position of the terminal device.

The invention claimed is:

1. A terminal device, comprising:
a communication interface configured to
communicate wirelessly with an access point via one of a plurality of channels at a first signal strength; and
circuitry configured to
obtain a position of the terminal device;
determine if wireless transmission channel restrictions apply to at least a first channel of the plurality of channels based on the position of the terminal device;
control communicating in a first state that complies with the wireless transmission channel restrictions if the wireless transmission channel restrictions apply based on the position of the terminal device; and
control communicating in a second state if the wireless transmission channel restrictions do not apply based on the position of the terminal device, wherein
the second state includes:
increasing the first signal strength for communicating via the one of the plurality of channels when the one of the plurality of channels is the at least first channel; and
maintaining the first signal strength for communicating via the one of the plurality of channels when the one of the plurality of channels is a channel of the plurality of channels other than the at least first channel.

2. The terminal device of claim 1, wherein the wireless transmission channel restrictions include one or more restriction locations that are stored in memory.

3. The terminal device of claim 2, wherein the wireless transmission channel restrictions include a first maximum signal strength at frequencies greater than a predetermined frequency.

4. The terminal device of claim 3, wherein higher frequency channels include one or more of the plurality of channels with at least one frequency in a channel bandwidth greater than the predetermined frequency.

5. The terminal device of claim 4, wherein the first signal strength of the higher frequency channels is less than the first maximum signal strength.

6. The terminal device of claim 1, wherein the circuitry is configured to obtain the position of the terminal device from a positioning system receiver.

7. The terminal device of claim 1, wherein the circuitry is configured to obtain the position of the terminal device based on a location of a base station that is communicating with the terminal device.

8. The terminal device of claim 1, wherein the circuitry is configured to obtain the position of the terminal device based on a location of a server to which the terminal device is connected via the access point.

9. The terminal device of claim 7, wherein the circuitry is configured to determine if the position of the terminal device is within one or more restriction locations.

10. The terminal device of claim 9, wherein the circuitry is configured to determine if the terminal device is communicating wirelessly via the at least first channel.

11. The terminal device of claim 10, wherein the terminal device is within one of the one or more restriction locations.

12. The terminal device of claim 11, wherein the circuitry is configured to notify the access point to switch to one of the plurality of channels other than the at least the first channel if the terminal device is communicating wirelessly via the at least the first channel.

13. The terminal device of claim 10, wherein the circuitry is configured to maintain a present channel that is other than the at least the first channel.

14. The terminal device of claim 12, further comprising a user-selectable setting that is used by the circuitry to notify the access point to switch to one of the plurality of channels other than the at least the first channel if the terminal device is communicating wirelessly via the at least first channel.

15. The terminal device of claim 14, wherein the user-selectable determines for the circuitry to maintain a present channel that is the at least the first channel.

16. The terminal device of claim 9, wherein the terminal device is outside the one or more restriction locations.

17. The terminal device of claim 15, wherein the circuitry is configured to establish a second signal strength that is greater than the first signal strength if the terminal device is communicating wirelessly via the at least the first channel.

18. The terminal device of claim 16, wherein the circuitry is configured to maintain wireless communication conditions if the terminal device is communicating wirelessly via one of the plurality of channels other than the at least the first channel.

19. A method of controlling wireless communications of a terminal device, comprising:
   communicating wirelessly with an access point via one of a plurality of channels at a first signal strength;
   obtaining a position of the terminal device;
   determining if wireless transmission channel restrictions apply to at least a first channel of the plurality of channels based on the position of the terminal device;
   control communicating in a first state that complies with the wireless transmission channel restrictions if the wireless transmission channel restrictions apply based on the position of the terminal device; and
   control communicating in a second state if the wireless transmission channel restrictions do not apply based on the position of the terminal device, wherein
   the second state includes:
      increasing the first signal strength for communicating via the one of the plurality of channels when the one of the plurality of channels is the at least first channel; and
      maintaining the first signal strength for communicating via the one of the plurality of channels when the one of the plurality of channels is a channel of the plurality of channels other than the at least first channel.

20. A non-transitory computer readable medium having instructions stored therein that, when executed by one or more processors, cause the one or more processors to perform a method of controlling wireless communications of a terminal device, the method comprising:
   communicating wirelessly with an access point via one of a plurality of channels at a first signal strength
   obtaining a position of the terminal device;
   determining if wireless transmission channel restrictions apply to the terminal device based on the position of the terminal device;
   control communicating in a first state that complies with the wireless transmission channel restrictions if the wireless transmission channel restrictions apply based on the position of the terminal device; and
   control communicating in a second state if the wireless transmission channel restrictions do not apply based on the position of the terminal device, wherein
   the second state includes:
      increasing the first signal strength for communicating via the one of the plurality of channels when the one of the plurality of channels is the at least first channel; and
      maintaining the first signal strength for communicating via the one of the plurality of channels when the one of the plurality of channels is a channel of the plurality of channels other than the at least first channel.

* * * * *